3,359,317
PROCESS FOR THE PRODUCTION OF
ALKENYL-ANILINES
Heinrich Krimm, Krefeld-Bockum, and Hermann Schnell, Krefeld-Urdingen, Germany, assignors to Farbenfabriken Bayer Aktiengesellschaft, Leverkusen, Germany, a German corporation
No Drawing. Filed May 20, 1964, Ser. No. 368,978
Claims priority, application Germany, May 24, 1963,
F 39,823
9 Claims. (Cl. 260—577)

The present invention is concerned with a process for the production of alkenyl-anilines.

It is known to produce alkenyl-anilines, besides anilines, by the splitting of bis-aminophenyl-alkanes in the presence of acidic catalysts. Thus, for example, 4-isopropenyl-aniline can be obtained from bis-(4-aminophenyl)-propane. For several reasons, this process is unsatisfactory. In the case of small batches (up to 15 grams) and where rapid distillation is effected, only 50-60% of the fission products actually obtained can be driven over and recovered, the residue being resinified irreversibly. The 4-isopropenyl-aniline can be obtained from the mixture of fission products by means of a second distillation to obtain only yields of up to about 30%. The stability of the distillation product itself is also small as a result of entrained acid, it being completely polymerized within a few hours. A further disadvantage relates to the fact that the diamines required as starting material are only obtainable from aniline and ketones in poor yields, in a process which is difficult to carry out.

It has now been found that alkenyl-anilines may be obtained readily and in good yields by heating hydroxy-phenyl-amino-phenyl-alkanes over alkaline catalysts and distilling off the alkenyl-anilines as and when they are formed, phenol being obtained as the other fission product.

The hydroxyphenyl-aminophenyl-alkanes are readily obtainable in good yields by the addition of aromatic amines on to alkenyl-phenols in the presence of acidic or basic catalysts according to the process of copending application Ser. No. 295,203 and now U.S. Patent No. 3,311,660.

Having regard to this process of production, the splitting of the hydroxyphenyl-aminophenyl-alkanes into alkenyl-anilines and phenols is surprising. It was to have been expected that the splitting would lead to the reformation of the original starting materials. In point of fact, the hydroxyphenyl-aminophenyl-alkanes can also be readily decomposed again into alkenyl-phenols and anilines by bringing them to decomposition temperatures over acidic catalysts. On the other hand, by a purely thermal splitting, a mixture of alkenyl-phenols, alkenyl-anilines, phenols and anilines results.

By the process according to the present invention, there can be produced, for example, the following alkenyl-anilines: 4-isopropenyl-aniline from 4-hydroxyphenyl-4'-aminophenyl-propane, N-methyl - 4 - isopropenyl-aniline from 2,2-(4-hydroxyphenyl - 4' - methylaminophenyl)-propane, N,N-dimethyl-4-isopropenyl-aniline from 2,2-(4-hydroxyphenyl-4'-dimethylaminophenyl) - propane, 2-methyl-4-isopropenylaniline from 2,2-(4-hydroxyphenyl-2'-methyl-4'-aminophenyl)-propane, 3 - methyl-4-isopropenyl-aniline from 2,2-(4 - hydroxyphenyl-3'-methyl-4'-aminophenyl)-propane, 3-chloro - 4 - isopropenyl-aniline from 2,2-(4-hydroxyphenyl-3'-chloro - 4' - aminophenyl)-propane, 3,5-dichloro-4-isopropenyl-aniline from 2,2-(4-hydroxyphenyl-3',5'-dichloro-4'-aminophenyl) - propane, 4-isobutenyl-aniline from 2,2-(4-hydroxyphenyl-4'-aminophenyl)-butane, 4-cyclohex-1'-enyl-aniline from 1,1-(4-hydroxyphenyl-4'-aminophenyl)-cyclohexane and 1,1-(4-amino-diphenyl)-ethene from 1,1,1-(4-hydroxy-4'-amino-triphenyl)-ethane. Based on the above disclosure and products, the reactants employed may be further summarized in the formula

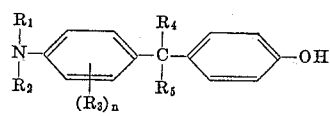

wherein
$R_1$ and $R_2$ are hydrogen or methyl;
$R_3$ is methyl or chloro;
$n$ is an integer of 0-2;
$R_4$ is individually defined as hydrogen, methyl, ethyl or 4-amino-phenyl, and
$R_5$ is individually defined as hydrogen or methyl, and
$R_4$ and $R_5$ in combination with the carbon atom being further defined as a cycloalkyl having 6 carbon atoms.

Examples of alkaline catalysts which can be used include alkali metals and alkaline earth metals and alkali metal and alkaline earth metal oxides, hydroxides, alcoholates, phenolates, alkylcarboxylates and carbonates, as well as zinc, cadmium and lead and the above-mentioned compounds of these metals.

The alkaline catalysts are expediently added to the hydroxyphenyl-aminophenyl-alkanes to be split in amounts of about 0.05 to 20% by weight.

The reaction temperature depends on the effectiveness of the basic catalysts and is, in general, between about 150 and about 300° C., preferably between 200 and 250° C.

In general, the splitting is to be carried out under the mildest conditions possible, i.e. under temperatures and pressure conditions which still just permit a sufficient splitting velocity and a rapid removal of the fission products from the reaction mixture. If, with the use of a strongly active catalyst, too high a splitting temperature is used, for example, by distilling at atmospheric pressure, then the formation of considerable amounts of by-products or resin must be taken into account.

The distillate of the fission products is expediently cooled immediately in order to prevent the resinification of the alkenyl-anilines. It is especially advantageous to collect the fission products in a cooled solvent, such as toluene or white spirit.

The phenols obtained as by-products are removed either by vacuum distillation or by shaking out with sodium hydroxide solution. The alkenyl-anilines can then be purified by distillation under reduced pressure. They can serve as intermediate products for the production of synthetic resins, dyestuffs, pharmaceutical agents and pesticides.

The following examples are given for the purpose of illustrating the present invention:

*Example 1*

227 grams (1 mol) 2,2-(4-hydroxy-4'-amino-diphenyl)-propane and 3 grams calcium hydroxide are heated, with stirring and passing over of nitrogen, at 200–250° C. and a pressure of 50 mm. Hg and the distillate which goes over at 100–160° C. is passed into 200 cc. of toluene cooled to −10° C. The residue amounts to 10 grams. The reaction product is suspended in the toluene in the form of a crystallized addition compound of 4-isopropenyl-aniline and phenol. The suspension is shaken out with 3 portions of 2 N sodium hydroxide solution (1.5 mol) and water and the toluene solution dried over anhydrous sodium sulfate and distilled. There are obtained 109 grams 4-ispropenyl-aniline of boiling point 125–128° C./11 mm. Hg. Yield: 82% of theory.

Example 2

26.7 grams (0.1 mol) 1,1-(4-hydroxy - 4' - amino-diphenyl)-cyclohexane and 0.2 gram powdered sodium hydroxide are heated, as described in Example 1, to 220–240° C./14 mm. Hg so that the distillation temperature of the fission products does not exceed 175° C. The distillate is dissolved in methylene chloride, shaken out twice with 100 cc. portions of 2 N sodium hydroxide solution and water and the solution is dried over anhydrous sodium sulfate and distilled. At 174–175° C./12 mm. Hg, 12.7 grams 4-cyclohex-1-enyl-aniline distil over. Yield: 73% of theory.

$C_{12}H_{15}H$ (173.25): Calculated C, 83.19; N, 8.09. Found C, 83.14; N, 8.24.

Example 3

24.1 grams (0.1 mol) 2,2-(4-hydroxy-4'-methylamino-diphenyl)-propane and 0.3 gram magnesium hydroxide are heated, as described in Example 1, to 220–240° C./30 mm. Hg so that the distillation temperature of the fission products does not exceed 150° C. The distillate, collected in a cooled receiver, is dissolved in methylene chloride, shaken out twice with 100 cc. 2 N sodium hydroxide solution and water and the solution dried over anhydrous sodium sulfate and distilled. There are obtained 8 grams N-methyl-4-isopropenyl-aniline of boiling point 138–145° C./12 mm. Hg. Yield: 54.5% of theory.

$C_{10}H_{13}N$ (147.21): Calculated C, 81.58; N, 9.52. Found: C, 81.17; N, 9.27.

Example 4

24.1 grams (0.1 mol) 2,2-(4-hydroxy-3'-methyl-4'-aminodiphenyl)-propane and 0.3 gram calcium hydroxide are heated, as described in Example 1, to 220–245° C./30 mm. Hg so that the distillation temperature of the fission products does not exceed 140° C. The distillate is collected in a receiver cooled with ice water. It is washed out with sodium hydroxide solution and distilled. There are obtained 8.8 grams 3-methyl-4-isopropenyl-aniline of boiling point 142–148° C./12 mm. Hg. Yield 60% of theory.

$C_{10}H_{13}N$ (147.21): Calculated C, 81.58; N, 9.52. Found: C, 81.21; N, 9.31.

We claim:

1. A process for producing an alkenyl aniline or cycloalkenyl aniline compounds comprising heating a hydroxy phenylaminophenyl alkane of the formula

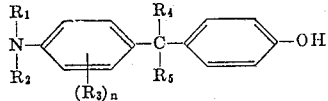

wherein $R_1$ and $R_2$ are hydrogen or methyl;
$R_3$ is methyl or chloro;
$n$ is an integer of 0–2;
$R_4$ is individually defined as methyl, ethyl or 4-aminophenyl, and
$R_5$ is individually defined as hydrogen or methyl, and
$R_4$ and $R_5$ in combination with the carbon atom being further defined as cycloalkyl having 6 carbon atoms;

in the presence of an active amount of a catalyst comprising alkali metal, alkaline earth metal and the corresponding oxide, hydroxide, alcoholate, phenolate, alkylcarboxylate and carbonate, zinc, cadmium, lead and their corresponding oxide, hydroxide, and caboxylates; and distilling off the resulting product as formed.

2. The process of claim 1, wherein the reaction is carried out under reduced pressure.
3. The process of claim 1, wherein the reaction is carried out at a temperature of about 150–300° C.
4. The process of claim 3, wherein the reaction is carried out at a temperature of about 200–250° C.
5. The process of claim 1, wherein the alkaline catalyst is used in an amount of about 0.05–20% by weight.
6. The process of claim 1, wherein the alkenyl-aniline product is cooled, immediately.
7. The process of claim 6, wherein the distillate is collected in a cooled solvent.
8. The process of claim 1, wherein the product is freed from phenol by-products by vacuum distillation.
9. The process of claim 1, wherein the product is freed from phenol by-products by shaking out with a solution of sodium hydroxide.

References Cited

Braun et al., "Annalen," vol. 472, pages 2–4, 6–7 and 11–12 (1929).

CHARLES B. PARKER, *Primary Examiner.*

R. V. HINES, *Assistant Examiner.*